(No Model.) 3 Sheets—Sheet 1.

J. M. McCLINTOCK.
HORSE HAY RAKE.

No. 399,765. Patented Mar. 19, 1889.

Witnesses.
M. Fowler
E. L. Biggs

Inventor.
James M. McClintock
By his Attorneys
C. A. Knowles

N. PETERS. Photo-Lithographer. Washington. D. C.

(No Model.) 3 Sheets—Sheet 2.

J. M. McCLINTOCK.
HORSE HAY RAKE.

No. 399,765. Patented Mar. 19, 1889.

Witnesses.
M. Fowler
E. G. Siggers

Inventor
James M. McClintock
By his Attorneys
C. A. Lowsley (No Model.) 3 Sheets—Sheet 3.
J. M. McCLINTOCK.
HORSE HAY RAKE.
No. 399,765. Patented Mar. 19, 1889.
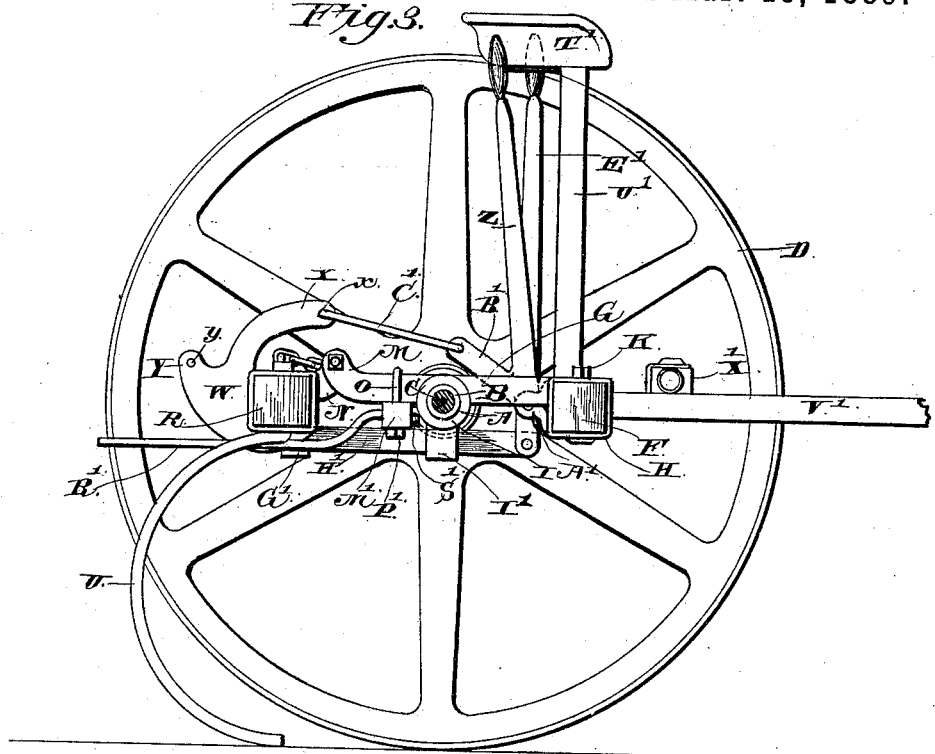
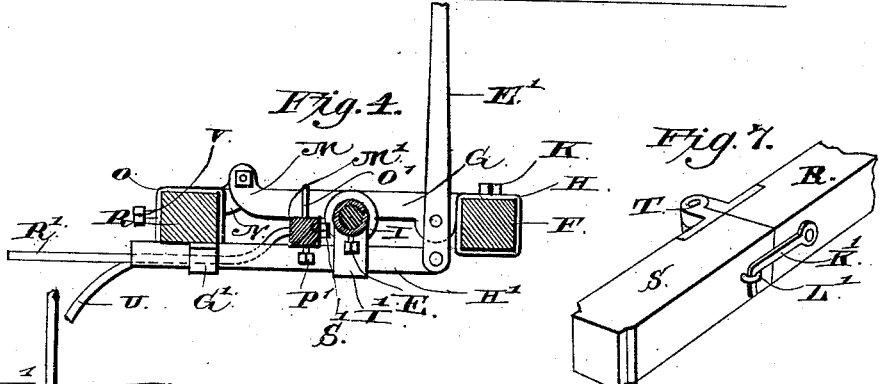
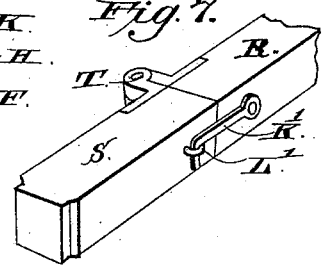
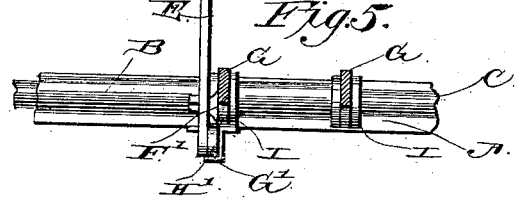
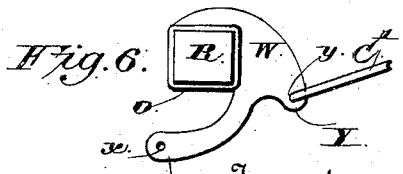
Witnesses
M. Fowler
Inventor,
James M. McClintock
By his Attorneys

UNITED STATES PATENT OFFICE.

JAMES MADISON McCLINTOCK, OF McKENZIE, TENNESSEE.

HORSE HAY-RAKE.

SPECIFICATION forming part of Letters Patent No. 399,765, dated March 19, 1889.

Application filed September 21, 1888. Serial No. 285,991. (No model.)

*To all whom it may concern:*

Be it known that I, JAMES MADISON MC-CLINTOCK, a citizen of the United States, residing at McKenzie, in the county of Carroll and State of Tennessee, have invented a new and useful Improvement in Horse Hay-Rakes, of which the following is a specification.

My invention relates to an improvement in horse hay-rakes; and it consists in the peculiar construction and combination of devices that will be more fully set forth hereinafter, and particularly pointed out in the claims.

The object of my invention is, first, to provide a horse hay-rake which is adapted to have its axle and rake-head contracted, so as to narrow the hay-rake and adapt the same to pass over narrow roads and bridges and through narrow gateways and barn-doors.

A further object of my invention is to provide an improved form of brake or detaining device to lock the rake-head in position when the rake-teeth are lowered.

A further object of my invention is to provide means whereby bars carrying the clearer or discharge teeth will be adjusted longitudinally to correspond with the lateral adjustability of the axle and rake-head; and a final object of my invention is to provide a horse hay-rake which is strong and simple, is thoroughly efficient in operation, and can be manufactured at comparatively slight cost.

Figure 1:
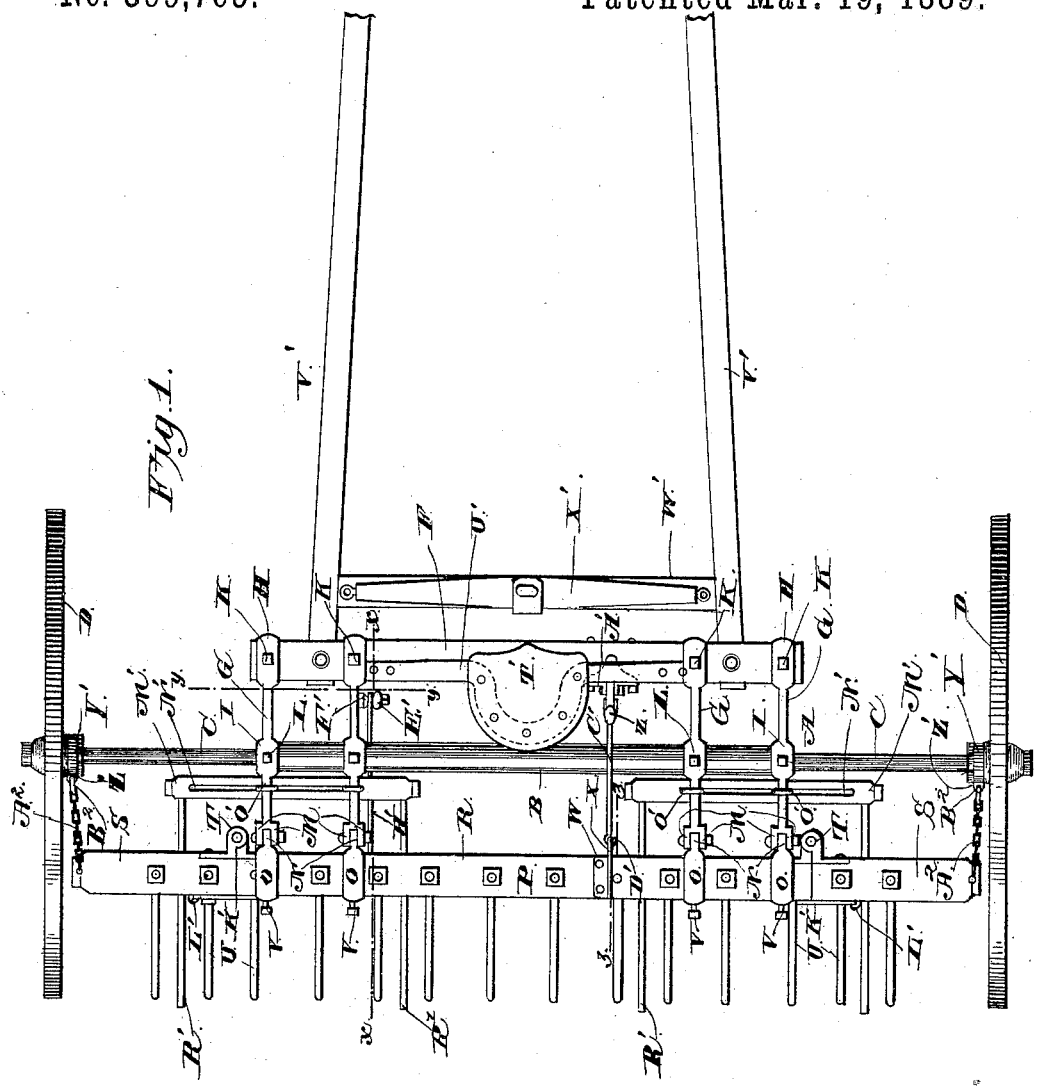
Figure 2:
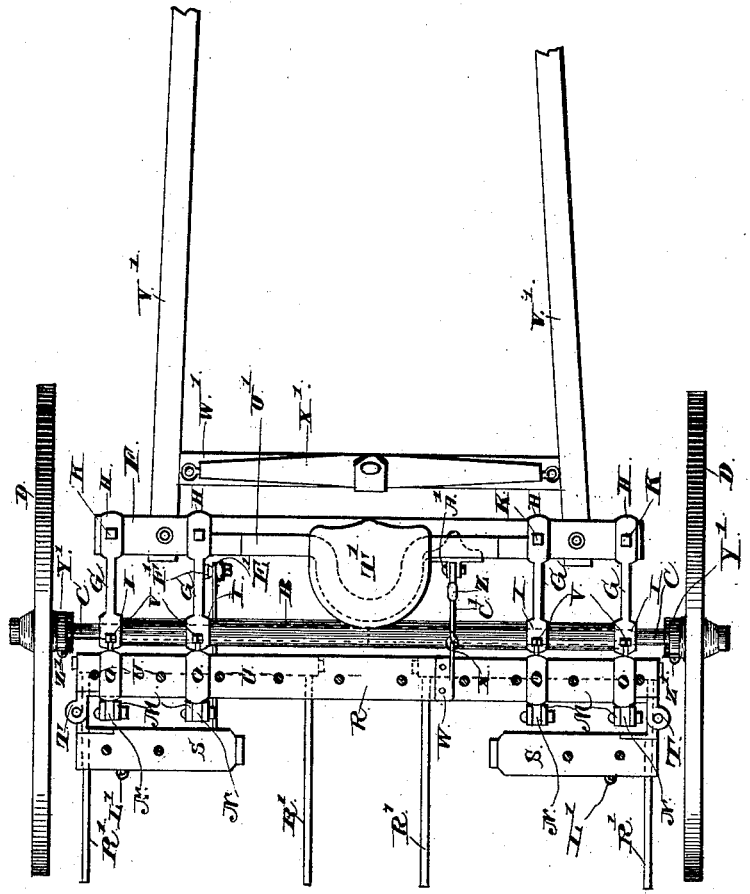

In the accompanying drawings, Figure 1 is a top plan view of my improved rake, showing the same extended to its full width and with the rake-teeth lowered to the ground and in operative position. Fig. 2 is a similar view showing the rake when arranged with its axle and rake-head contracted so as to reduce the width of the machine to enable the same to pass through narrow places or over narrow roads. Fig. 3 is a side elevation of my improved horse hay-rake, showing the same in operative position, the near wheel being removed. Fig. 4 is a vertical sectional view taken on the line $x\,x$ of Fig. 1. Fig. 5 is a similar view taken on the line $y\,y$ of Fig. 1. Fig. 6 is a similar view taken on the line $z\,z$ of Fig. 1.

A represents a telescoping axle, which consists of a central hollow cylindrical section, B, and a pair of cylindrical end sections, C, which have their inner ends fitted in the central tubular section, and adapted to slide longitudinally therein. The said extensions C are provided at their outer ends with spindles, on which are journaled the usual supporting-wheels, D.

From the foregoing description it will be understood that when the sections C are drawn outward in the tubular section B the wheels are moved from each other, so as to widen the axle, and that when said sections C are moved into the tube toward each other the width of the axle is decreased. Set-screws E engage threaded openings near the ends of the section B, and are adapted to impinge on the sections C, so as to lock the latter at any desired adjustment in the section B.

F represents a draft-bar, which is arranged parallel with the central section, B, and at a suitable distance in advance of the same, and is secured to the said central section by means of longitudinal bars G, which are provided at their front ends with rectangular collars or boxes H, through which the draft-bar is inserted, and has cylindrical boxes I at a suitable distance from their rear ends, in which the section B is inserted. Any suitable number of the said bars may be employed, according to the size and required strength of the machine. As illustrated in the accompanying drawings, two pairs of said bars are employed, arranged at suitable distances from each other, and near the ends of sections B and the draft-bar. Set-screws K extend through the boxes H and the draft-bar F, and set-screws L bind the boxes I to the axle-section B. The rear ends of the connecting-bars G are bifurcated to form ears M, and between the said ears are pivoted the front ends of hinge-extensions N, each of which has a rectangular box, O.

P represents the rake-head, which comprises the central section, R, and the extensions S, which are connected to the ends of the central section, R, by means of hinges T. The said hinges are arranged on what is the front side of the rake-head when the latter is arranged in its operative position, and said hinges adapt the extensions S to be folded on the central section, R, so as to reduce the width of the rake-head, as will be readily understood. The said central section, R, is fitted in the boxes O of the hinged extensions N, and is thereby adapted to be swung upward, so as to raise the rake-teeth U from the ground. Each of the boxes O has a set-screw, V, whereby the central section of the rake-head may be firmly clamped thereto.

W represents a casting, which is bolted to the section R of the rake-head, is provided with a forward-extending upwardly-curved arm, X, and has a rearward-extending arm or offset, Y, which is at right angles practically to the arm X. The latter has an opening, $x$, in its outer end, and the arm or offset Y has a similar opening, $y$.

Z represents a hand-lever, which is fulcrumed to a casting or bearing, A', that is bolted to the draft-bar F. The said lever is provided at its lower end with an acute-angled arm, B'.

C' represents a rod, which has its front end pivoted to the arm B' and has a hook, D', at its rear end, which is adapted to be engaged either with the opening $x$ or the opening $y$, for the reasons to be hereinafter stated.

E' represents a brake or detent lever, which is fulcrumed to a casting or bearing, F', that is secured to one of the connecting-bars G. On the under side of the main or central section of the rake-head at a suitable distance from one end thereof is secured a loop or keeper, G'.

H' represents a bolt or detent, which is guided in a suitable support, I', that depends from the main section of the axle and has its front end attached pivotally to the lower end of the lever E'. When the rake-head is turned to cause its rake-teeth to bear on the ground, the rear end of the detent or bolt H' registers with the loop or keeper G', and by moving the upper end of the lever E' forward said bolt or detent may be caused to enter said loop or keeper, and thereby lock the rake-head in this position and prevent the same from springing or being forced upward while the rake-teeth are at work.

When the machine is in operation, the rod C' is hooked to the arm X, and when the rake-head becomes filled with hay the lever Z may be operated so as to cause the said rod and the curved arm X of casting W to turn the rake-head upward, and thereby lift the rake-teeth from the ground and discharge their load of hay. When it is desired to reduce the width of the machine to enable the same to pass through a narrow place or in order to store the rake, the rod C' will, after the rake-head has been turned over toward the front on the hinges at the forward part of the hinge-extension N' upon the connecting arms or bars G, to elevate the rake-teeth, be unhooked from the arm X and hooked to the arm or offset $y$, in order to lock the rake-head securely in this position, and the extensions S of the rake-head will be folded inward on the hinges T against the central section, R, thereof.

In order to securely fasten the extensions S when the same are extended to a position in line with the central section, R, I provide hooks K', which are pivoted to the sides of the extension R opposite hinges T, and are adapted to engage keepers L', secured on the corresponding sides of the extensions S.

It will be of course understood that before the rake-head is raised, as hereinbefore stated, the lever E' must be operated to withdraw the bolt or detent H' from the loop or keeper G'.

M' represents a pair of bars, which carry the clearer-teeth, of suitable length, which are provided each with a longitudinal vertical slot, N'.

O' represents U-shaped bolts, which are arranged astride of the connecting-bars G at a suitable distance in rear of the axle and have their lower ends passed through the slots N' and provided with clamping-nuts P', which bear against the lower sides of the bars M', and hence secure the said bars at any desired longitudinal adjustment, the slots N' of said bars adapting the same to be moved in the direction of their length under the connecting-bars G.

R' represents discharge or clearer teeth, which have their front ends passed through transverse openings near the ends of the bars M' and clamped thereto by nuts S'. The said discharge or clearer teeth extend rearward under the rake-head and between the proximate rake-teeth. The function of the said teeth R' is to strip the hay from the rake-teeth when the rake is elevated, as will be readily understood.

By means of the bars M', to which the clearing or discharge teeth are attached, being adjustable in the direction of their length, the same may be moved inward or drawn outward to correspond with the adjustability of the axle or rake-head.

T' represents a seat for the driver, which is supported by a suitable bar or spring, U', above the center of the draft-bar F. The said seat-bar is arched, has its ends bolted on the draft-bar, and has its central portion provided with a curved rearward-extending offset corresponding to the contour of the bottom of the seat, as shown.

V' represents a pair of thills, which have their rear ends secured to the draft-bar in the usual or any suitable manner, and are connected together by the usual cross-bar, W', on which is pivoted the usual singletree, X'. By this means a horse may be harnessed to the rake in the usual manner.

To the inner ends of the hubs of the wheels are swiveled rings Y', each of which has an eye, Z'. Linked rods or stay-chains $A^2$ are secured to the extensions of the rake-heads, and have hooks $B^2$ at their free ends, which are adapted to engage the eyes Z' when the rake-head is extended, and thereby connect the outer ends of the rake-head to the hubs of the wheels, and hence prevent the rake-head from yielding under strain when the machine is in operation.

Having thus described my invention, I claim—

1. In a horse hay-rake, the combination of the telescoping axle comprising the central tubular section and the sliding extension C therein, the horizontally-pivoted rake-head having the vertically-hinged extensions S, the bars G, through which the central section of the rake-head is pivoted to the central section of the axle, and the bars M', attached to and adjustable on the connecting-bars and having the discharge or clearing teeth, substantially as described.

2. In a horse hay-rake adapted to be widened or contracted, the combination of the rake-head and axle, the bars G, the bars M', having slots N', the bolts attached to the bars G and extending through the said slots, and the clamping-nuts on said bolts, whereby the bars M' may be secured at any adjustment, the said bars having the clearing or discharge teeth R', substantially as described.

3. The combination, in a horse hay-rake, of the draft-bar F, the telescoping axle comprising the tubular section B and the end extensions, C, therein, the rake-head comprising the central section, R, and the extensions S vertically hinged to the ends thereof, the connecting-bars G, having their front ends provided with boxes H, in which the draft-bar is secured, provided further with the boxes I for the central tubular axle-section, and the extensions N, horizontally hinged to the rear end of bars G, and having the boxes O in which the central section of the rake-head is secured, substantially as described.

4. The combination, in a hay-rake, of the lever Z fulcrumed to the frame, the rake-head hinged or pivoted to the frame, and thereby adapted to be raised or lowered, the casting W, secured to the rake-head and having the arms X and Y, and the rod C', attached to the lever and adapted to be connected to either of said arms, substantially as described.

5. In a horse hay-rake, the combination of the wheels having the ring swiveled to their hubs, the extensible axle on which the wheels are mounted, the rake-head having the hinged extensions, and the stay chains or rods attached to said extensions and having the hooks to engage the rings, substantially as described.

In testimony that I claim the foregoing as my own I have hereto affixed my signature in presence of two witnesses.

JAMES MADISON McCLINTOCK.

Witnesses:
E. B. SHAW,
J. K. RAMSEY.